(12) United States Patent
Uchida

(10) Patent No.: US 8,468,314 B2
(45) Date of Patent: Jun. 18, 2013

(54) STORAGE SYSTEM, STORAGE APPARATUS, AND REMOTE COPY METHOD FOR STORAGE APPARATUS IN MIDDLE OF PLURAL STORAGE APPARATUSES

(75) Inventor: Koji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 12/603,823

(22) Filed: Oct. 22, 2009

(65) Prior Publication Data
US 2010/0042795 A1   Feb. 18, 2010

Related U.S. Application Data

(63) Continuation of application No. PCT/JP2007/059298, filed on May 1, 2007.

(51) Int. Cl.
*G06F 12/00* (2006.01)
*G06F 12/16* (2006.01)

(52) U.S. Cl.
USPC ............. 711/162; 711/E12.001; 711/E12.103

(58) Field of Classification Search
USPC ........................ 711/162, E12.001, E12.103
See application file for complete search history.

(56) References Cited

U.S. PATENT DOCUMENTS

| | | | |
|---|---|---|---|
| 6,591,351 B1 | 7/2003 | Urabe et al. | |
| 6,760,824 B2 | 7/2004 | Urabe et al. | |
| 2004/0250023 A1 | 12/2004 | Urabe et al. | |
| 2005/0033828 A1 | 2/2005 | Watanabe | |
| 2005/0154937 A1* | 7/2005 | Achiwa | 714/6 |
| 2005/0160248 A1 | 7/2005 | Yamagami | |
| 2005/0188254 A1 | 8/2005 | Urabe et al. | |
| 2006/0064558 A1 | 3/2006 | Cochran et al. | |
| 2006/0085608 A1* | 4/2006 | Saika | 711/162 |
| 2006/0107098 A1 | 5/2006 | Maki et al. | |
| 2006/0161732 A1* | 7/2006 | Murotani et al. | 711/114 |
| 2006/0195667 A1 | 8/2006 | Nakano et al. | |
| 2006/0212668 A1 | 9/2006 | Furukawa et al. | |
| 2007/0011361 A1 | 1/2007 | Okada et al. | |

FOREIGN PATENT DOCUMENTS

| | | |
|---|---|---|
| JP | 2001-43030 | 2/2001 |
| JP | 2002-49517 | 2/2002 |
| JP | 2004-507813 | 3/2004 |
| JP | 2005-055948 | 3/2005 |
| JP | 2005-276162 | 10/2005 |
| JP | 2006-127217 | 5/2006 |
| JP | 2006-260292 | 9/2006 |
| JP | 2007-18236 | 1/2007 |
| WO | 02/17056 | 2/2002 |

OTHER PUBLICATIONS

International Search Report for PCT/JP2007/059298, mailed Jul. 10, 2007.

* cited by examiner

*Primary Examiner* — Mardochee Chery
(74) *Attorney, Agent, or Firm* — Staas & Halsey LLP

(57) ABSTRACT

Plural storage devices are cascade connected via a network, and the remote copy is executed among the plural storage devices. The data transferred from the copy source are temporarily stored in the buffer. Upon completion of the data reception, the data in the buffer are output to the data storage unit collectively, and the data are transmitted to the network connected storage device as the copy destination.

5 Claims, 14 Drawing Sheets

FIG.7

| \[25\] BUFFER CONTROL MANAGEMENT INFORMATION |||
|---|---|---|
| STORAGE APPARATUS 1-1 | STORAGE APPARATUS 1-2 | STORAGE APPARATUS 1-3 |
| COPY SOURCE BUFFER IDENTIFICATION INFORMATION 1A (CM5-0) | COPY DESTINATION BUFFER IDENTIFICATION INFORMATION 1B (CM5-0) | COPY DESTINATION BUFFER IDENTIFICATION INFORMATION 1C (CM5-0) |
| COPY SOURCE BUFFER IDENTIFICATION INFORMATION 1A (CM5-1) | COPY DESTINATION BUFFER IDENTIFICATION INFORMATION 1B (CM5-1) | COPY DESTINATION BUFFER IDENTIFICATION INFORMATION 1C (CM5-1) |
| ⋮ | ⋮ | ⋮ |
| COPY SOURCE BUFFER IDENTIFICATION INFORMATION NA (CM5-0) | COPY DESTINATION BUFFER IDENTIFICATION INFORMATION NB (CM5-0) | COPY DESTINATION BUFFER IDENTIFICATION INFORMATION NC (CM5-0) |
| COPY SOURCE BUFFER IDENTIFICATION INFORMATION NA (CM5-1) | COPY DESTINATION BUFFER IDENTIFICATION INFORMATION NB (CM5-1) | COPY DESTINATION BUFFER IDENTIFICATION INFORMATION NC (CM5-1) |

STORAGE SYSTEM, STORAGE APPARATUS, AND REMOTE COPY METHOD FOR STORAGE APPARATUS IN MIDDLE OF PLURAL STORAGE APPARATUSES

CROSS-REFERENCE TO RELATED APPLICATIONS

This is a continuation of Application PCT/JP2007/059298, filed on May 1, 2007, the entire contents of which are incorporated herein by reference.

FIELD

The embodiment discussed herein is related to storage system, storage apparatus and remote copying method.

BACKGROUND

The storage system includes a host and a storage apparatus for storing data of the host. Recently, intensified business activity demands increase in the capacity of data to be stored in the storage apparatus. Accordingly loss of those data may give a serious influence on such business activity.

In order to secure the data stored in the storage apparatus, data duplication has been conducted in the storage apparatus. The aforementioned method is very effective for coping with the disk failure and the hardware failure in the storage apparatus. In the case where the apparatus itself is damaged by such disaster as earthquake, the method may fail to secure the data which have been duplicated in the storage apparatus. The storage apparatus is duplicated as the countermeasure against the natural disaster in various forms, for example, the duplicated storage apparatuses are installed on different floors, or in different cities.

The storage system is provided with a remote copy function for copying the data among the aforementioned storage apparatuses. The storage system uses the remote copy function between remotely located storage apparatuses, which allows mirroring of the database as the countermeasure against the natural disaster. Generally the database system includes means for recovering data in case of the failure of the apparatus such as the server and the natural disaster by conducting self control/assurance of the sequence for writing to the data storage apparatus such as the storage apparatus. The storage apparatus which uses the remote copy function is required to reflect data on the mirroring storage apparatus while maintaining the sequence of the data written from the host. Irrespective of the failure in the host during the operation, the data processing may be continued based on the data stored in the mirrored storage apparatus using the auxiliary storage system host so long as the sequence is secured.

FIG. 1A illustrates the remote copy control method of the storage apparatus as related art. The mirroring is executed by transferring data between a buffer 33 exclusive for a control module 35 (CM0, CM1) of the storage apparatus 31 as the copy source, and a buffer 43 exclusive for a control module 45 (CM0, CM1) of a remotely connected storage apparatus 41.

1) The storage apparatus 31 as the copy source temporarily stores data I/O (1)-I/O (5) from the host in a disk unit 34, and thereafter, stores the data in the buffer 33 for the transfer.
2) Periodical data transfer is performed between the buffers 33 and 43 from the storage apparatus 31 as the copy source to the storage apparatus 41 as the copy destination. In the storage apparatus 31 as the copy source, the transfer timing from the buffer 33 to the storage apparatus 41 as the copy destination is synchronized between the CM0-CM1.
3) The storage apparatus 41 as the copy destination reflects the data transferred from the storage apparatus 31 as the copy source on the disk unit 44. In the storage apparatus 41 as the copy destination, the output timing of the buffer 43 is synchronized between CM0-CM1.

Plural buffers 33 and 43 are employed, and data are transferred from the storage apparatus 31 as the copy source to the storage apparatus 41 as the copy destination while maintaining each sequence of the plural buffers 33 and 43, respectively and correlating the buffers 33 and 43. As a result, the sequence of data in the storage apparatus 41 as the copy destination is secured. Recently, the data assurance has been regarded as being more important for the system. Not only the single apparatus but also the plural apparatuses are required to be mirrored. In the case where the remote copy to the plural apparatuses is supported as the extension of the generally employed technology, the following problems may occur.

FIG. 1B illustrates a storage apparatus 51 at the intermediate location.

1) The data transferred from the storage apparatus 31 as the copy source, and stored in a buffer 53-1 are temporarily stored in a disk unit 54. The output of the data in the buffer 53-1 to the disk units 54 is conducted in parallel without considering the data sequence.
2) The data stored in the disk unit 54 are stored in a buffer 53-2, and then transferred to the storage apparatus 41 as the copy destination. The data are stored in the buffer 53-2 in the sequence of writing to the disk unit 54, and accordingly, the data are transferred to the storage apparatus 41 without securing the sequence as described above. The storage apparatus 51 requires double buffers, that is, buffers 53-1 and 53-2. The remote copy between the storage apparatuses 51 and 31, and the remote copy between the storage apparatuses 51 and 41 are separately controlled. So the data sequence cannot be secured among the plural apparatuses (refer to Japanese Laid-open Publication No. 2006-260292).

SUMMARY

According to an aspect of the invention, a storage system includes a first storage apparatus, a second storage apparatus connected with the first storage apparatus, and a third storage apparatus connected with the second apparatus. The first storage apparatus includes a first storage unit, a first buffer, and a first controller to control the first storage apparatus according to a process including storing data in the first storage unit into the first buffer, transferring all of the data stored in the first buffer to the second storage apparatus, upon the first buffer being full with the data or a predetermined time elapsing from storing the data into the first buffer. The second storage apparatus includes a second storage unit, a second buffer, and a second controller to control the second storage apparatus according to a process including storing the data received from the first storage apparatus into the second buffer, outputting all of the received data in the second buffer from the second buffer to the second storage unit, upon completing of reception of the data, transferring all of the received data in the second buffer to the third storage apparatus, upon completing of reception of the data. The third storage apparatus includes a third storage unit, a third buffer, and a third controller to control the third storage apparatus according to a process including storing the data received from the second storage apparatus into the third buffer, outputting all of the received data in the third buffer from the third buffer to the third storage unit, upon completing of reception of the data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 illustrates buffer control management information.

DESCRIPTION OF EMBODIMENT

Figure 1A:
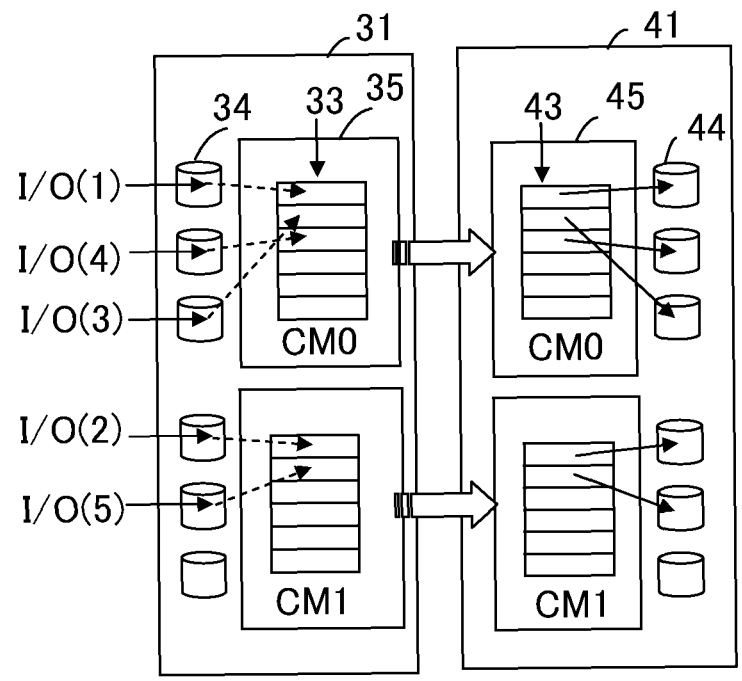
FIGS. 1A to 1B illustrate an explanatory diagram of method for controlling remote copying of storage apparatus according to a known art.
Figure 1B:
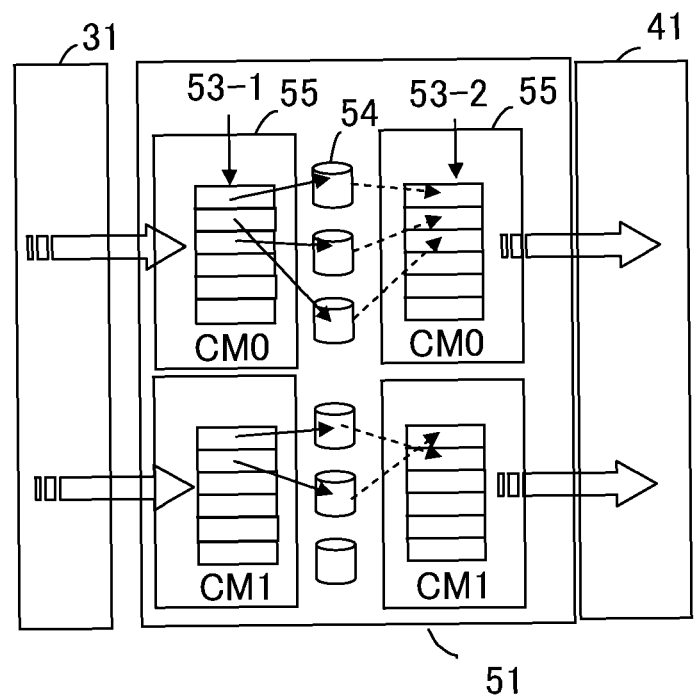
Figure 2:
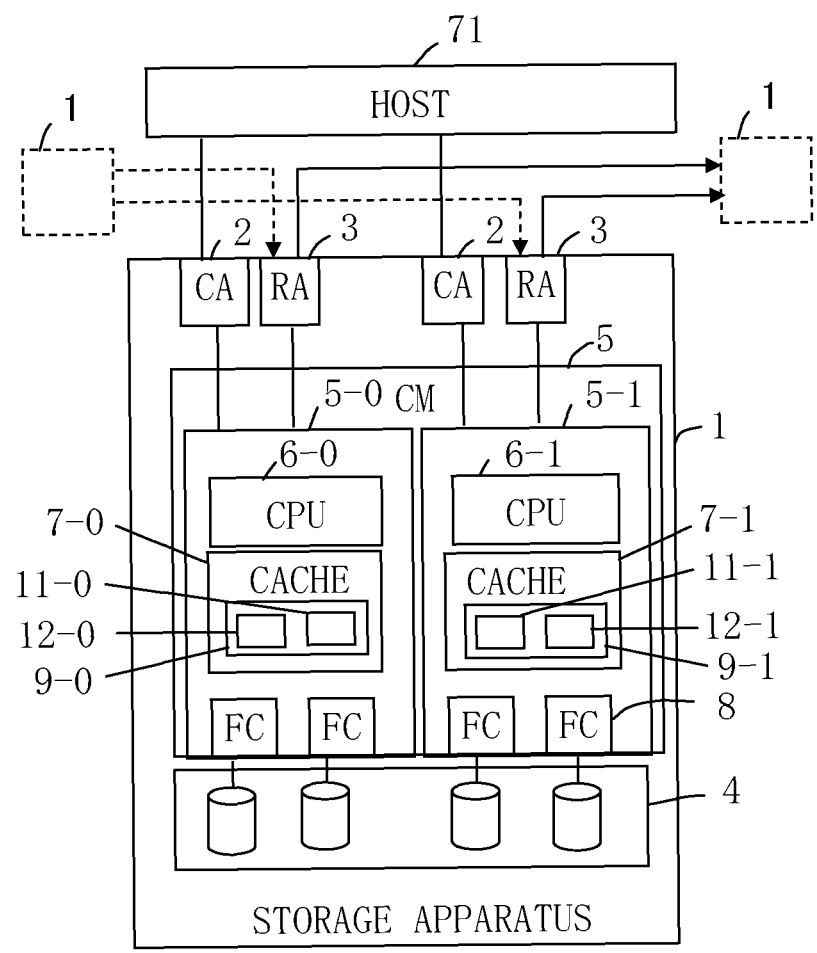
FIG. 2 illustrates structure diagram of the storage apparatus.

FIG. 2 illustrates structure diagram of the storage apparatus. A storage system includes a host 71 and a storage apparatus 1. The storage apparatus 1 stores data of the host 71. The storage apparatus 1 includes a channel adapter (CA) 2, a remote adapter (RA) 3, a disk unit 4, and a control module (CM) 5.

The CA 2 serves as an interface control unit with respect to the host 71.

The RA 3 serves as an interface control unit with respect to the storage apparatus 1 as the copy source and/or the storage apparatus 1 as the copy destination.

The disk unit 4 writes the data in accordance with the data write command from the CM 5, and reads the data in accordance with the data read command from the CM 5 so as to be transferred thereto.

The CM 5 controls with respect to writing of the data to the disk unit 4 in accordance with the write command from the host 71. The CM 5 controls with respect to reading of the data from the disk unit 4 in accordance with the read command from the host 71. The CM 5 executes the remote copy control with remotely located storage apparatus 1. The CM 5 includes a central processor unit (CPU) 6, a cache memory (CACHE) 7, and a fibre channel interface control unit (FC) 8. The CM 5 is formed of two modules of CM 5-0 and CM 5-1 each having the same structure.

The CPU 6 controls the CM 5. A CPU 6-0 is installed in the CM 5-0, and a CPU 6-1 is installed in the CM 5-1, respectively.

The CACHE 7 is a memory in the CM 5. A CACHE 7-0 is installed in the CM 5-0, and a CACHE 7-1 is installed in the CM 5-1. The CACHE 7 stores user data, control data and the like from the host 71. The CACHE 7 includes a buffer 9 used for the remote copy mode. A buffer 9-0 is installed in the CACHE 7-0, and a buffer 9-1 is installed in the CACHE 7-1, respectively. The data from the host 71, and the copy data are written into the disk unit 4 via a user data region of the CACHE 7.

The buffer 9 includes a consistency buffer 11 for storing the copy data, and a various information buffer 12. A consistency buffer 11-0 and a various information buffer 12-0 are contained in the buffer 9-0, and a consistency buffer 11-1 and a various information buffer 12-1 are contained in the buffer 9-1.

The FC 8 serves as an interface control unit with respect to the disk unit 4.

The buffer 9 stores various information data of five types, that is, copy session management information 21, consistency buffer management information 22, apparatus management information 23, buffer status management information 24, and buffer control management information 25.

The consistency buffer 11 is formed of plural consistency buffers 11, and switched while maintaining the sequence of the plural consistency buffers 11 to secure the sequence. The write command data sequence from the host 71 may be maintained so long as it is ensured to write all the data in the respective consistency buffers 11 into the disk unit 4.

Figure 3:
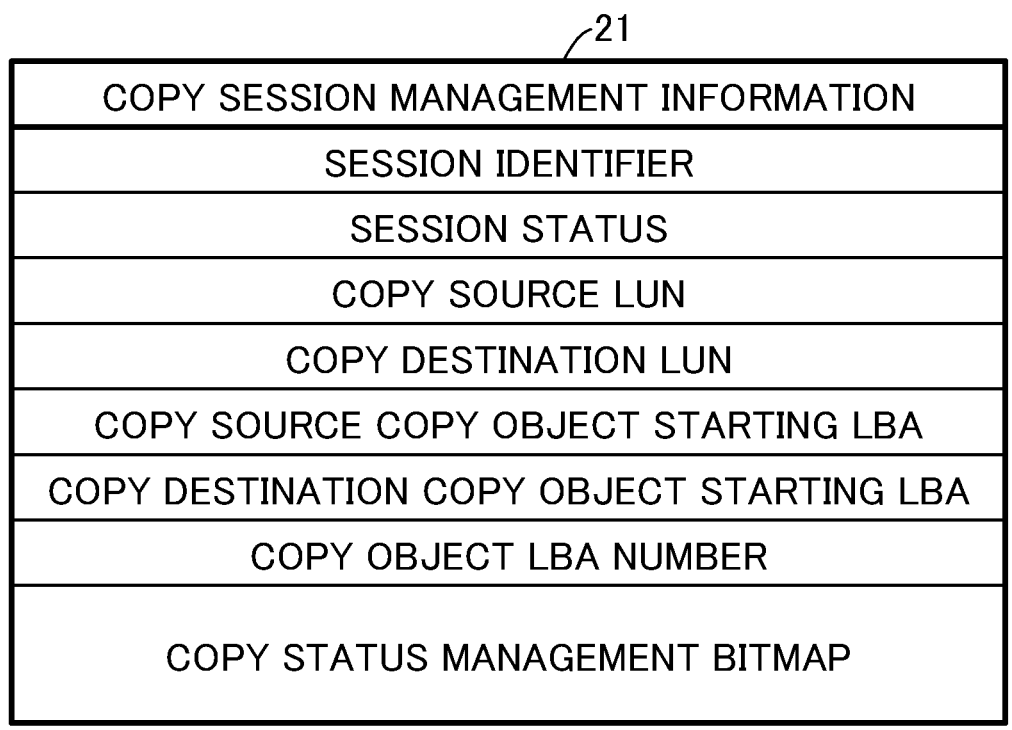
FIG. 3 illustrates copy session management information.

FIG. 3 represents the copy session management information. The copy session management information 21 represents LUN (Logical Unit Number) and LBA (Logical Block Address) indicating the range for executing the remote copy. The copy session management information 21 contains a session identifier, a session status, a copy source LUN, a copy destination LUN, a copy source copy object starting LBA, a copy destination copy object starting LBA, a copy object LBA number, and a copy status management bit map (Bit Map). The LUN denotes a logic unit number of the disk unit 4, and the LBA denotes a logic block address. The session identifier represents the number unique to the session.

The session status represents the status of the session, that is, the active status, the suspended status and the like. The LUN and LBA are set at the desired timing for the copy by the dedicated command for establishing the session via the LAN connected to the storage apparatus 1. The information data on the LUN/starting LBA/LBA number of the copy source and the copy destination are designated using the command parameter, which will be reflected on the copy session management information 21.

The copy status management Bit Map uses the bit flag to indicate whether or not the remote copy of the LUN and LBA in the copy region has been completed. If a certain LBA is in an uncopied status, the corresponding bit is turned ON. If it is in a copied status, the corresponding bit is turned OFF.

Figure 4:
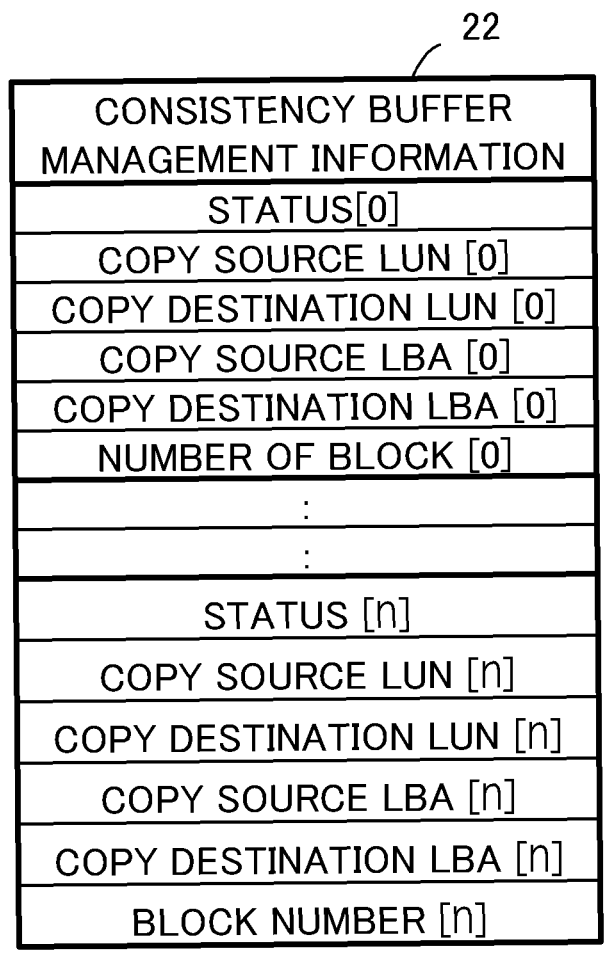
FIG. 4 illustrates consistency buffer management information.

FIG. 4 illustrates the consistency buffer management information. The consistency buffer management information 22 represents address information of data stored in the consistency buffer 11. The consistency buffer management information 22 is formed of a status, a copy source LUN, a copy destination LUN, a copy source LBA, a copy destination LBA, and a block number. The status represents the data storage status, that is, whether the data have been stored or not. The address information of the copy source of data stored in the consistency buffer 11 is illustrated by the copy source LUN and the copy source LBA, and the address information of the copy destination is illustrated by the copy destination LUN and the copy destination LBA.

Figure 5:
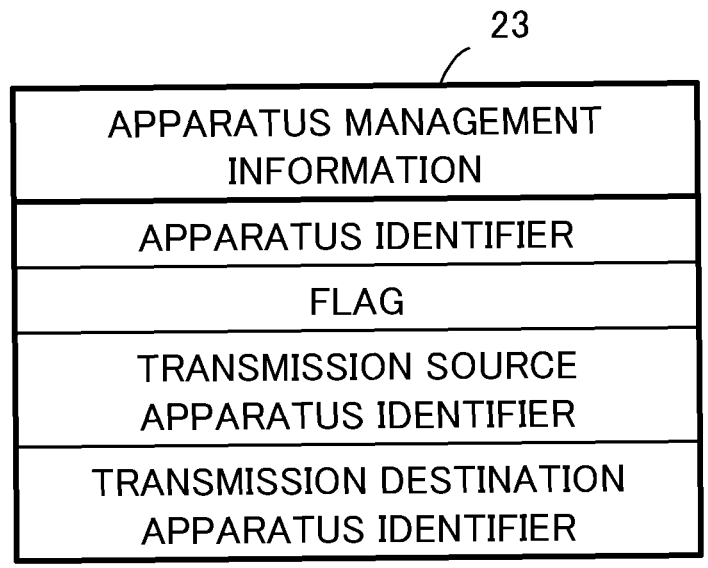
FIG. 5 illustrates apparatus management information.

FIG. 5 illustrates the apparatus management information. The apparatus management information 23 illustrates the connection relationship with the other storage apparatus 1. The apparatus management information 23 is formed of an apparatus identifier, a flag, a transfer source apparatus identifier, and a transfer destination apparatus identifier. The apparatus identifier represents the identifier information of the storage apparatus 1.

The flag represents the connection status of the storage apparatus 1, that is, connection or disconnection status of the transfer source and the transfer destination. In case of the storage apparatus 1 located at the intermediate position of the cascade connection, flags for the transfer source and the transfer destination are set. If the conditions are satisfied, the copy data from the storage apparatus 1 as the copy source are reflected on the disk unit 4, and the transfer to the buffer 9 of the next storage apparatus 1 is started.

The transfer source apparatus identification information represents the identifier of the storage apparatus 1 as the transfer source of the copy data. The transfer destination apparatus identifier represents the identification information of the storage apparatus 1 as the transfer destination of the copy data.

Figure 6:
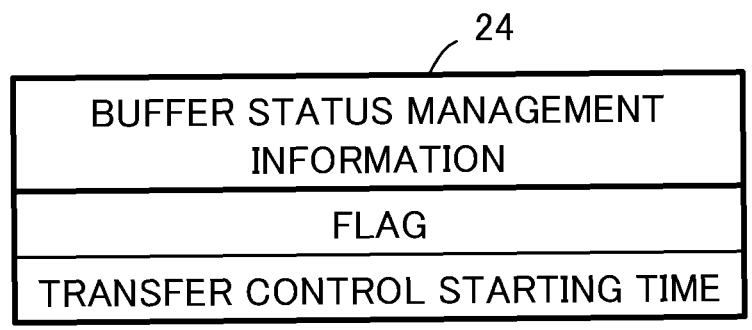
FIG. 6 illustrates buffer status management information.

FIG. 6 illustrates the buffer status management information. The buffer status management information 24 is the information that represents the status of the consistency buffer 11, and contains the flag and the transfer control starting time.

The flag represents the status of the consistency buffer 11, specifically, three types of the copy data status, that is, "storage status to the consistency buffer 11", "transfer status from the consistency buffer 11", and "reflection status from the consistency buffer 11 on the disk unit 4". In case of the storage apparatus 1 at the intermediate location of the cascade connection, both "reflection status on the disk unit 4" and "transfer status from the consistency buffer 11" to the next storage apparatus 1 have been set. If any one of the processings is completed earlier, the completed status is reset.

The time at which the transfer is started is set as the transfer control starting time. The transfer processing time is determined in accordance with the difference between the aforementioned information and the current time. It is used for controlling the HALT process indicating the interruption of the transfer in the case where the time exceeds the predetermined value.

FIG. 7 illustrates the buffer control management information. The buffer control management information 25 represents the correlation of the consistency buffers 11 among the storage apparatuses 1-1 to 1-3. For example, copy source buffer identification information 1A (CM 5-0) of the storage apparatus 1-1 corresponds to copy destination buffer identification information 1B (CM 5-0) of the storage apparatus 1-2, and the copy destination buffer identification information 1C (CM 5-0) of the storage apparatus 1-3. Copy source buffer identification information 1A (CM 5-1) of the storage apparatus 1-1 corresponds to copy destination buffer identification information 1B (CM 5-1) of the storage apparatus 1-2, and copy destination buffer identification information 1C (CM 5-1) of the storage apparatus 1-3. The aforementioned correlations for N units of the consistency buffers 11 are prepared.

The buffer control management information 25 is preliminarily stored in the respective storage apparatus 1. Alternatively, the system for notifying the corresponding buffer identification number and the region size from the storage apparatuses 1-2 and 1-3 in response to the buffer request from the storage apparatus 1-1 may be employed in the initial processing. The buffer identification number to be used in the copy destination is transmitted upon data transfer for the remote copy.

Figure 8:
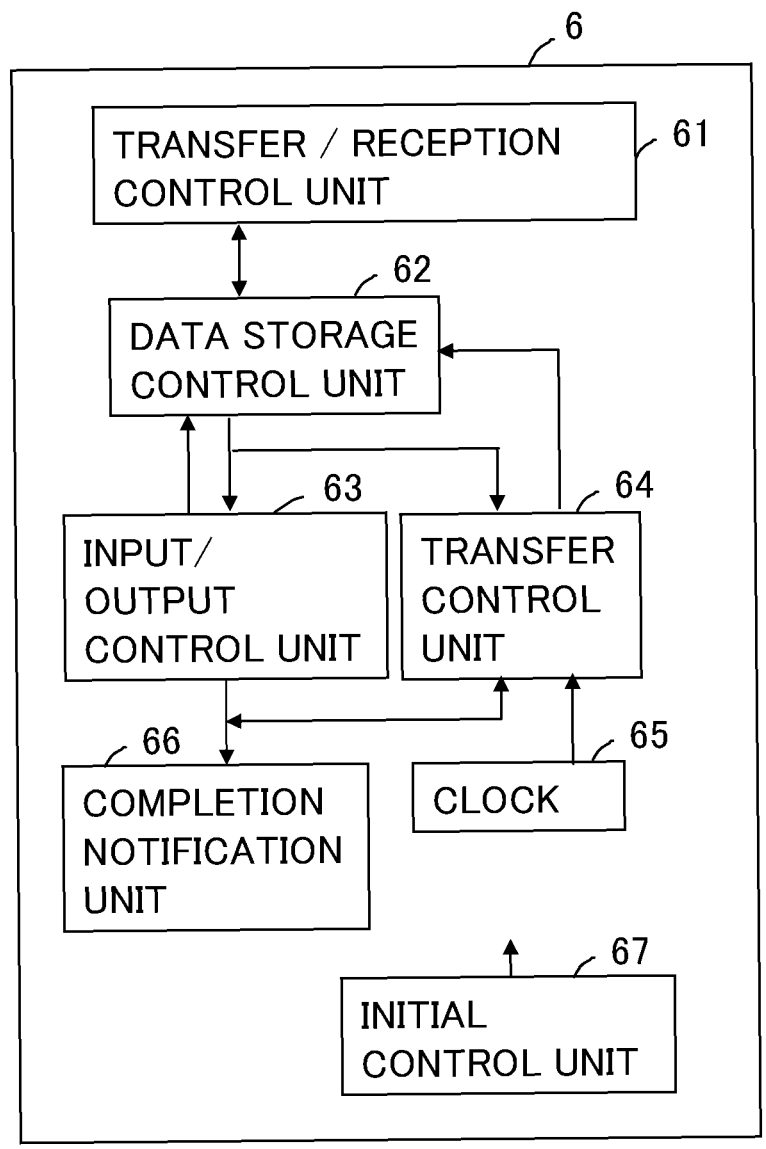
FIG. 8 illustrates an explanatory diagram of CPU control.

FIG. 8 illustrates an explanatory diagram of the CPU control. The CPU 6 includes a transmission/reception control unit 61, a data storage control unit 62, an input/output control unit 63, a transfer control unit 64, a clock 65, a completion notification unit 66, and an initial control unit 67 for executing the remote copy.

The transmission/reception control unit 61 transmits/receives data to/from the CA2.

The data storage control unit 62 includes three data storage functions as follows:

(1) executing the process to store the transfer/reception data to/from the host 71;
(2) executing the process to store data received by the transfer control unit 64 from the storage apparatus 1 as the copy source in the consistency buffer 11; and
(3) executing the process to store the copy data to be transferred to the storage apparatus 1 as the copy destination in the consistency buffer 11 from the disk unit 4 or the CACHE 7.

The input/output control unit 63 executes the process to store the data which have been transferred from the storage apparatus 1 as the copy source and stored in the consistency buffer 11 in the disk unit 4. The input/output control unit 63 executes the control for writing the data from the host 71 in the disk unit 4, and the control for reading the data from the disk unit 4 so as to be transmitted to the host 71.

The transfer control unit 64 includes three control functions as follows:

(1) executing the process to transfer the data stored in the consistency buffer 11 to the storage apparatus 1 as the copy destination;
(2) controlling to send the copy data received from the storage apparatus 1 as the copy source to the data storage control unit 62; and
(3) executing the process to interrupt the data transfer to the storage apparatus 1 as the copy destination based on the determination of time-up upon detection that the time counted from the transfer starting time exceeds the threshold value.

The clock 65 is used for monitoring the time taken for the transfer control unit 64 to transfer the data stored in the consistency buffer 11 to the storage apparatus 1 as the copy destination.

The completion notification unit 66 executes the process to notify the storage apparatus 1 as the copy source of completion of the copy.

The initial control unit 67 executes the initial process such as the process for setting the flag of the apparatus management information 23 and the control for establishing the copy sessions.

Figure 9A:
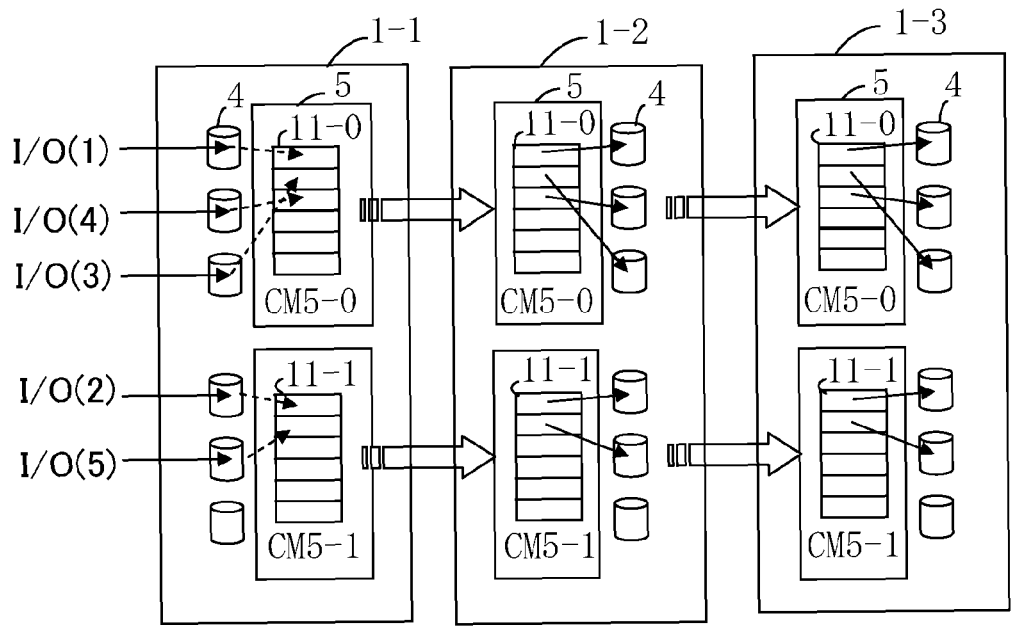
FIGS. 9A to 9B illustrate an explanatory diagram of a cascade connection of the storage apparatuses.
Figure 9B:
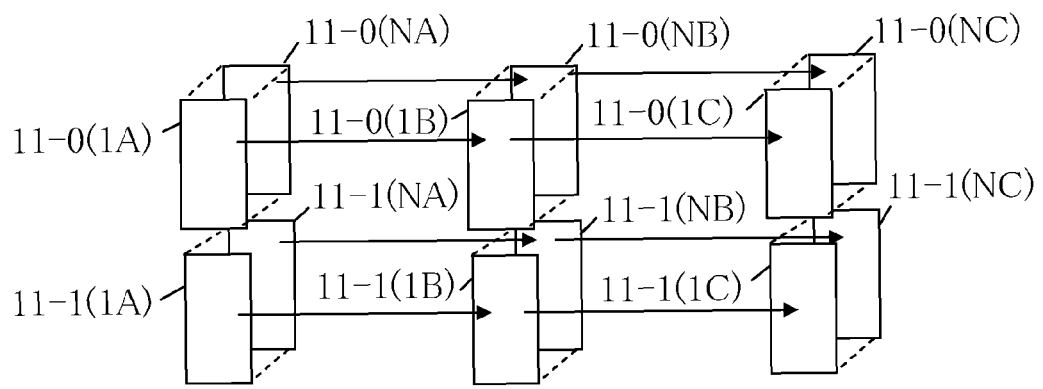

FIGS. 9A to 9B illustrate an explanatory diagram of the cascade connection of the storage apparatuses. The operation will be described as below.

FIG. 9A illustrates an example of the cascade connection. The storage apparatuses 1-1, 1-2, and 1-3 are cascade connected. In the example, upon reception of write command data I/O(1)-(5) from the host 71 to the storage apparatus 1-1, the data are transferred to the storage apparatuses 1-2 and 1-3 while maintaining the sequence.

FIG. 9B is an explanatory view of the correlation among the consistency buffers. The consistency buffer 11 is formed of a buffer set including consistency buffers 11-0 and 11-1. Each of the storage apparatuses 1 includes plural buffer sets. The plural buffer sets are correlated among the respective storage apparatuses 1. N units of the buffer sets from the one including the consistency buffers 11-0 (1A) and 11-1 (1A) to the one including the consistency buffers 11-0 (NA) and 11-1

(NA) will be sequentially switched when the state of the buffer becomes full or a predetermined time elapses from the data storage.

The buffer sets of the storage apparatuses 1-2 and 1-3 are sequentially switched in response to the command of the storage apparatus 1 as the copy source. The sequence of the copy data is assured by securing the buffer set sequence.

The remote copy is the function for copying the data in the disk unit 4 of the storage apparatus 1-1 designated as the copy source in the disk units 4 of the storage apparatuses 1-2 and 1-3 which are designated as the copy destinations via each path between the storage apparatuses 1. Upon completion of the copy between the storage apparatuses 1, equivalence among the storage apparatuses 1-1 to 1-3 may be established.

In response to the command from the host 71 and the like, the session for the remote copy is established between the storage apparatus 1 as the copy source and the storage apparatus 1 as the copy destination. Then the data to be copied are transferred from the storage apparatus 1-1 as the copy source to the storage apparatus 1-2 as the copy destination. Upon completion of the data transfer from the storage apparatus 1-1 to the storage apparatus 1-2, the data to be copied are further transferred from the storage apparatus 1-2 to the storage apparatus 1-3. For the copy data transfer, the data to be copied are temporarily stored in the consistency buffer 11 of the storage apparatus 1-1 as the copy source, and then transferred to the consistency buffer 11 of the storage apparatus 1-2 as the copy destination collectively. The data to be copied are collectively transferred from the consistency buffer 11 of the storage apparatus 1-2 to the consistency buffer 11 of the storage apparatus 1-3 as the copy destination. Meanwhile, the data to be copied stored in the consistency buffer 11 are written into the disk units 4 of the storage apparatuses 1-2 and 1-3, respectively. The data to be copied are transferred from the consistency buffer 11 through the buffer set including the consistency buffers 11-0 and 11-1.

Figure 10:
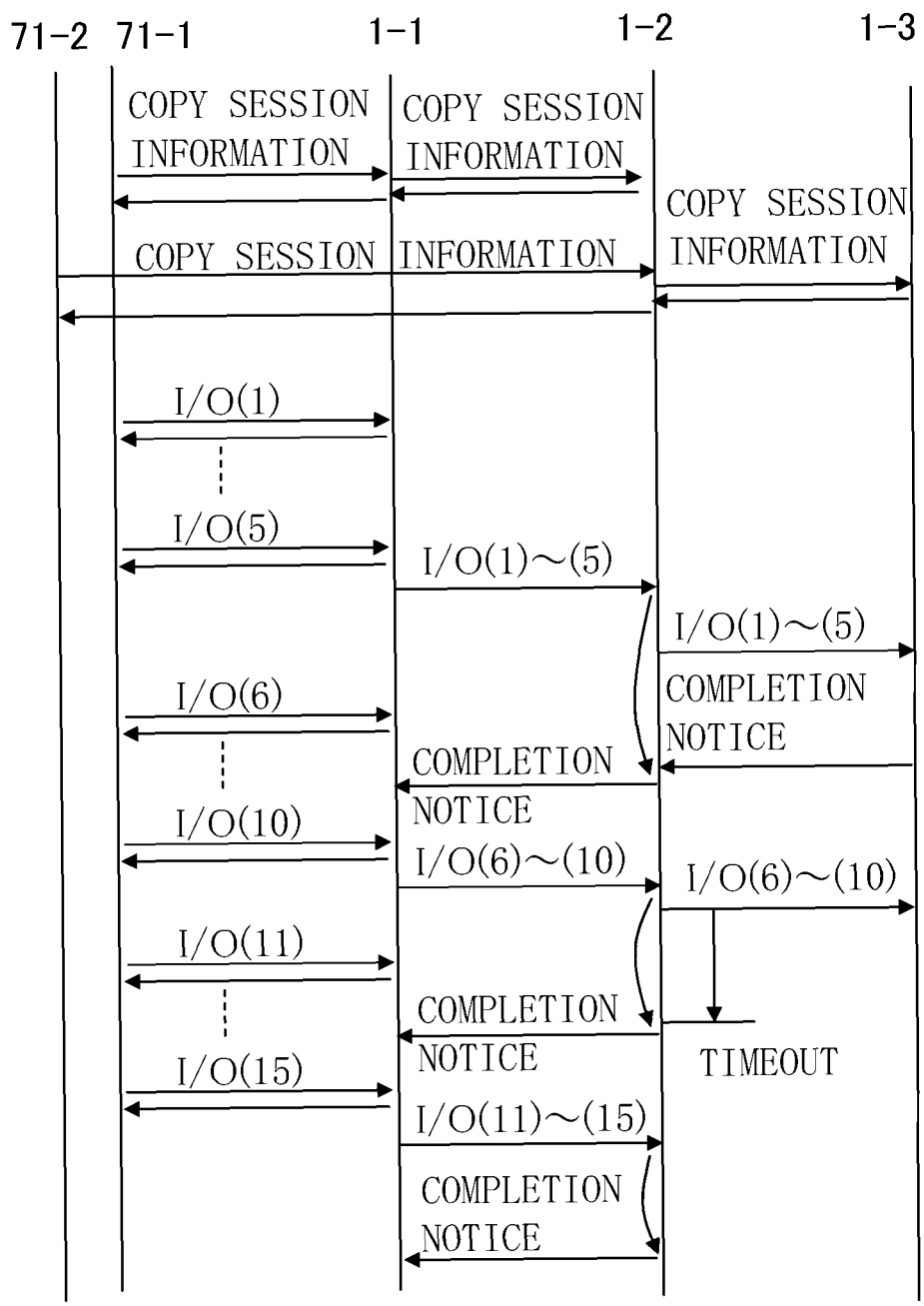
FIG. 10 illustrates an explanatory diagram of remote copy operation.

FIG. 10 illustrates an explanatory diagram of the remote copy operation. In an example illustrated in the drawing, the storage apparatuses 1-1 to 1-3 are cascade connected. A host 71-1 is connected to the storage apparatus 1-1, and a host 71-2 is connected to the storage apparatus 1-2.

(1) Process for Establishing Copy Session

The storage apparatus 1-1 receives the copy session information for the remote copy from the host 71-1. The copy session information for establishing the session contains the information data with respect to LUN/starting LBA/LBA number of the copy source and the copy destination, respectively. The storage apparatus 1-1 transmits the copy session information to the storage apparatus 1-2, and the storage apparatus 1-2 returns the response with respect to establishment of the session to the storage apparatus 1-1. The storage apparatus 1-1 then returns the response with respect to the establishment of the session to the host 71-1.

The storage apparatus 1-2 receives the copy session information for the remote copy from the host 71-2. The storage apparatus 1-2 transmits the copy session information to the storage apparatus 1-3, and the storage apparatus 1-3 returns the response with respect to establishment of the session to the storage apparatus 1-2. Then the storage apparatus 1-2 returns the response with respect to the establishment of the session to the host 71-2. The copy session is established among the storage apparatuses 1-1 to 1-3. The hosts 71-1 and 71-2 execute the copy session information process in collaboration with each other.

(2) Process for Copying I/O(1)-(5)

The storage apparatus 1-1 receives write data addressed thereto from the host 71-1, for example, I/O(1)-(5). The storage apparatus 1-1 only stores the predetermined information with respect to the respective data in the consistency buffer management information 22 without copying. The data are further stored in the disk unit 4 via the CACHE 7. Upon completion of the write process form the host 71-1 to the storage apparatus 1-1, the storage apparatus 1-1 obtains data for the remote copy from the disk unit 4 or the CACHE 7 based on the consistency buffer management information 22. The obtained data are transferred to the consistency buffer 11. In the case where any one of the buffer sets including the consistency buffer 11-0 of the CM 5-0 and the consistency buffer 11-1 of the CM 5-1 becomes full, or a predetermined time elapses, the storage apparatus 1-1 as the copy source notifies the buffer identification number to be used in the copy destination. Upon reception of the buffer identification number of the copy destination, the storage apparatus 1-2 allocates the consistency buffer 11 to be used. The storage apparatus 1-1 transmits the consistency buffer management information 22 prior to the copy data transfer. The storage apparatus 1-1 transfers the I/O (1)-(5) data to the corresponding consistency buffer 11 of the storage apparatus 1-2 as the copy destination collectively.

The storage apparatus 1-2 as the copy destination is kept stand-by until completion of receiving the data to the consistency buffer 11 rather than reflecting the received data on the disk unit 4 immediately. The storage apparatus 1-2 as the copy destination stores all the copy data in the consistency buffer 11, and then outputs those data to the disk unit 4 collectively. Upon reception of the I/O (1)-I/O (5) data and completion of storage to the consistency buffer 11, the storage apparatus 1-2 transfers the data to the storage apparatus 1-3 collectively. The storage apparatus 1-2 notifies the buffer identification number to be used in the storage apparatus 1-3 as the copy destination. The storage apparatus 1-3 as the copy destination allocates the consistency buffer 11. The storage apparatus 1-2 transmits the consistency buffer management information 22 corresponding to the consistency buffer 11 of the storage apparatus 1-2 prior to the copy data transfer. The storage apparatus 1-2 transmits the I/O (1)-I/O(5) data to the storage apparatus 1-3.

Upon reception of completion notification that output of the copy data to the disk unit 4 is completed, and the write process from the storage apparatus 1-3 to the disk unit 4 thereof is completed, the storage apparatus 1-2 transmits the completion notification to the storage apparatus 1-1 as the copy source. In this way, the copy data are transferred among the consistency buffers 11 in the storage apparatuses 1. The sequence of the plural consistency buffers 11 is secured among the storage apparatuses 1. As a result, the data sequence of the remote copy among the storage apparatuses 1 may be maintained.

(3) Process for Copying I/O (6)-(10)

The storage apparatus 1-2 monitors the time from the start to the end of the transfer to the storage apparatus 1-3 with respect to the consistency buffer 11. Supposing that the storage apparatus 1-2 receives the subsequent I/O (6)-I/O (10) data from the storage apparatus 1-1, if the monitored time exceeds the threshold value in the process of the transfer of I/O (6)-I/O (10) data from the storage apparatus 1-2 to the storage apparatus 1-3 to cause "time-out", the storage apparatus 1-2 immediately brings the transfer to the storage apparatus 1-3 into HALT status.

Upon completion of the I/O (6)-I/O (10) data output, the storage apparatus 1-2 returns the completion notification to the storage apparatus 1-1. The storage apparatus 1-2 cannot release the consistency buffer 11 thereof unless the transfer to the storage apparatus 1-3 is completed. In the state where the storage apparatus 1-1 as the copy source executes another transfer to the storage apparatus 1-2, when the consistency buffer 11 becomes unavailable for the reception by the storage apparatus 1-2, the storage apparatus 1-1 determines that the storage apparatus 1-2 is in HALT status, and interrupts the transfer. For this, the storage apparatus 1-2 conducts the transfer interruption process at the early stage such that the transfer to the storage apparatus 1-3 hardly influences the transfer between the storage apparatuses 1-1 and 1-2.

(4) Process for Copying I/O (11)-(15)

When the storage apparatus 1-2 receives I/O (11)-I/O (15) data subsequent to the I/O (6)-I/O (10) data to complete the output to the disk unit 4, the completion notification is returned to the storage apparatus 1-1. The I/O(11)-I/O(15) data are not transferred to the storage apparatus 1-3 in HALT status. Execution of the additional time monitoring control allows the copy data transfer process to be continued at least between the storage apparatuses 1-1 and 1-2. The equivalence in the remote copy of at least the single storage apparatus may be maintained.

Figure 11:
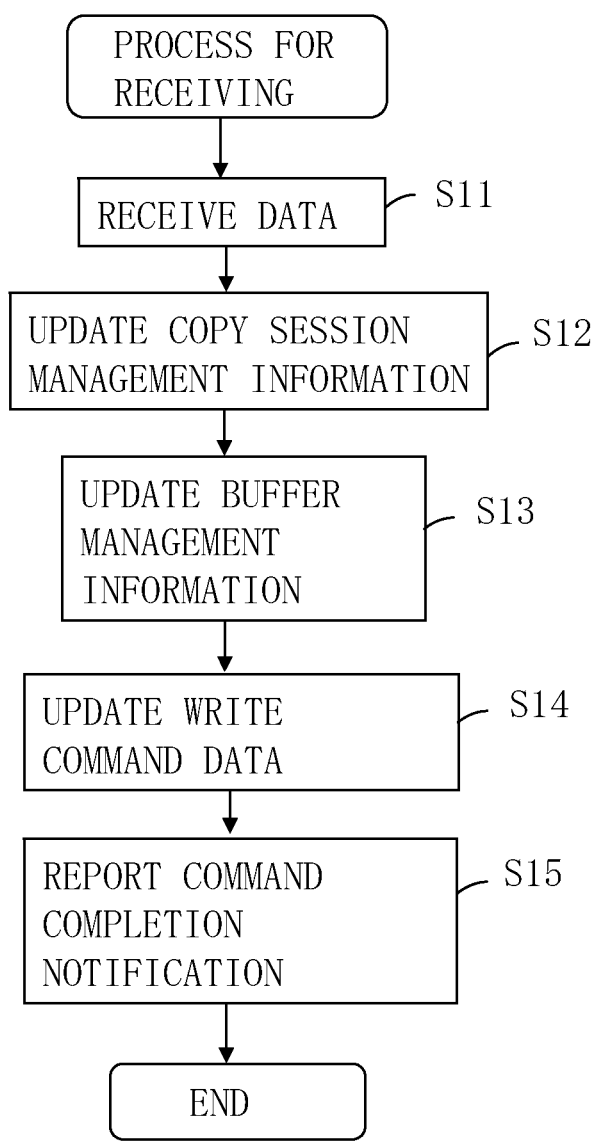
FIG. 11 is a flowchart of process for receiving data from host.

FIG. 11 is a flowchart illustrating the process for receiving data from the host. The data reception process from the host 71 to the storage apparatus 1-1 will be described. In the initial process, the flag indicating the cascade connection has been already set in the apparatus management information 23. The copy session establishment process has already been completed.

The storage apparatus 1-1 receives the data from the host 71 in response to the write command (S11). Then the storage apparatus 1-1 updates the copy session management information 21 by turning on position of the copy status management bit map of the copy session management information 21 corresponding to the update position by the write command ON (S12).

The storage apparatus 1-1 stores the copy source LUN/LBA, and the copy destination LUN/LBA in the consistency buffer management information 22 based on the write command. The copy destination LUN/LBA information is derived from the write command LUN/LBA information and the copy session management information 21. The consistency buffer management information 22 is generated in accordance with the data reception order of the write command. Then, the storage apparatus 1-1 brings the status of the consistency buffer management information 22 into the non-storage status. The consistency buffer management information 22 is updated for each of the consistency buffers 11-0 and 11-1 (S13).

The storage apparatus 1-1 updates the write command data (S14). The storage apparatus 1-1 writes the write command data in the disk unit 4 via the CACHE 7. Then the storage apparatus 1-1 reports the command completion notification with respect to the write command to the host 71 (S15). The storage apparatus 1-1 executes the aforementioned process steps for each write command from the host 71.

Figure 12:
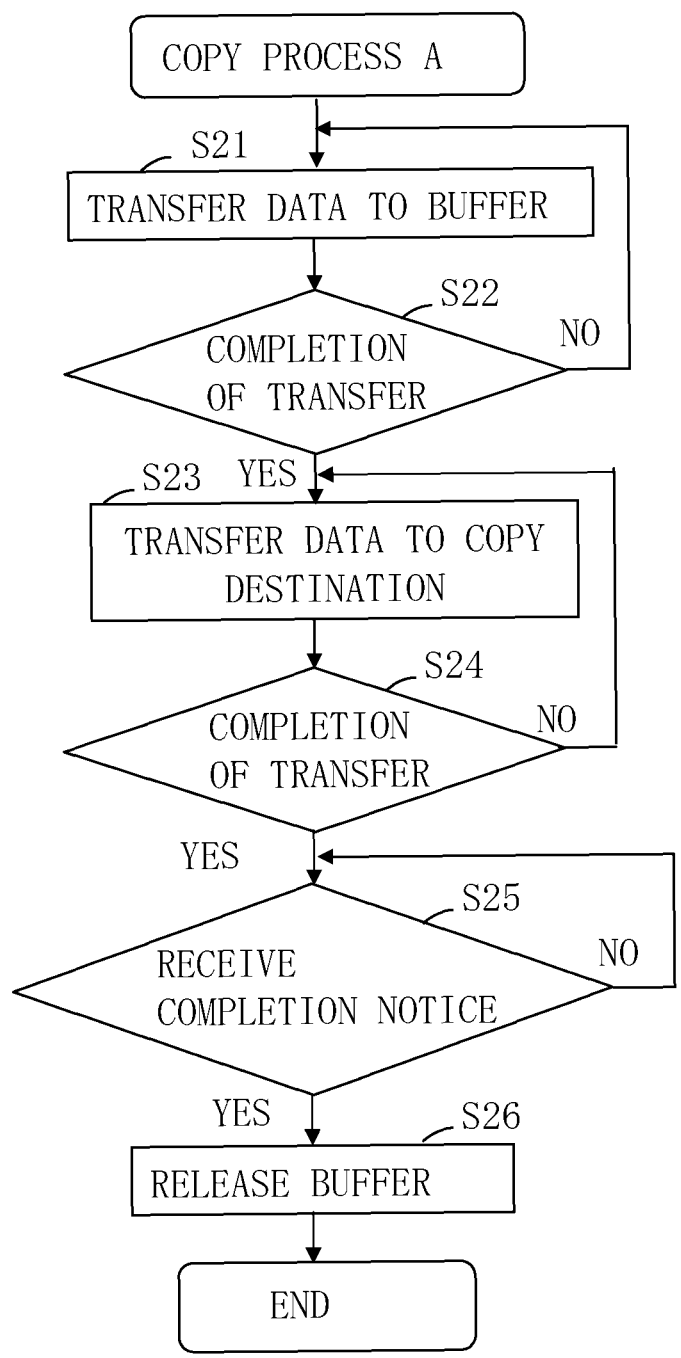
FIG. 12 is a flowchart of copy process A.

FIG. 12 is a flowchart of a copy process A. The copy process executed in the storage apparatus 1-1 will be described. The copy process from the storage apparatus 1-1 to the storage apparatus 1-2 is executed. Upon completion of updating the data from the host 71 in step S15, the storage apparatus 1-2 copies data from the disk unit 4 or the CACHE 7 to the consistency buffer 11 of the buffer 9. It is searched whether the updated consistency buffer management information 22 is in the non-storage status. If the non-storage status is searched, the corresponding data of the copy destination are extracted from the disk unit 4 or the Cache 7. The data are transferred to the consistency buffer 11 (S21). Upon completion of the transfer, the non-storage status of the consistency buffer management information 22 is changed into the storage status. The storage apparatus 1-2 checks if the data transfer has been completed or not (S22).

When the transfer has been completed, the storage apparatus 1-2 transmits the buffer control management information 25 and the consistency buffer management information 22 to the storage apparatus 1-2. The storage apparatus 1-2 then transfers the copy data stored in the consistency buffer 11 to that of the storage apparatus 1-2 as the copy destination collectively (S23). As the consistency buffer 11 of the storage apparatus 1-1 has the consistency buffers 11-0 and 11-1, the copy data are transferred to the corresponding consistency buffers 11-0 and 11-1 of the storage apparatus 1-2. Upon completion of the transfer (S24), the process is kept stand-by until the completion notification from the storage apparatus 1-2 is received (S25). Upon reception of the completion notification, the consistency buffer 11 of the storage apparatus 1-1 is released (S26). The bit corresponding to the data having its transfer completed is cleared from the copy status management bit map.

As a result, the remote copy among plural cascade corrected storage apparatuses may be executed while securing the copy data sequence.

Figure 13A:
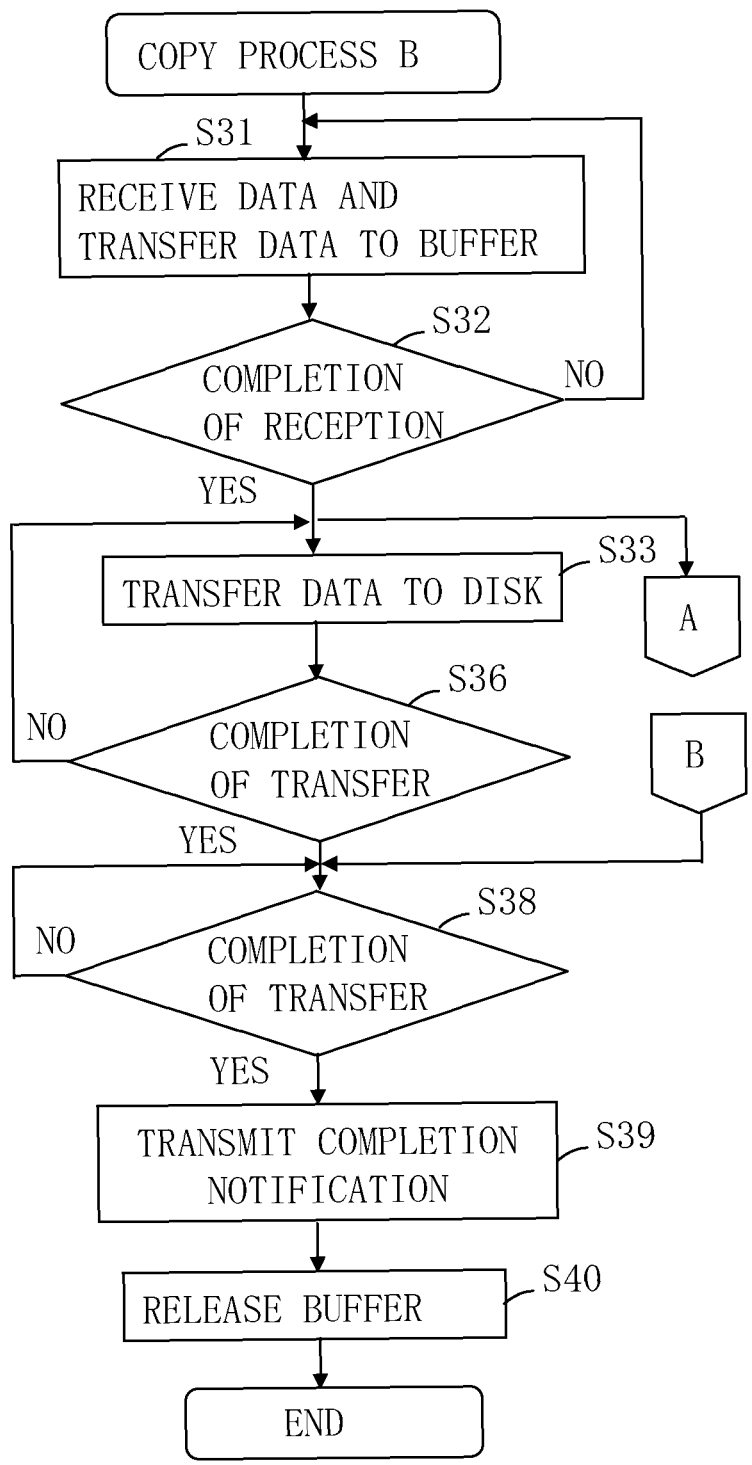
FIGS. 13A to 13B are a flowchart of copy process B.
Figure 13B:
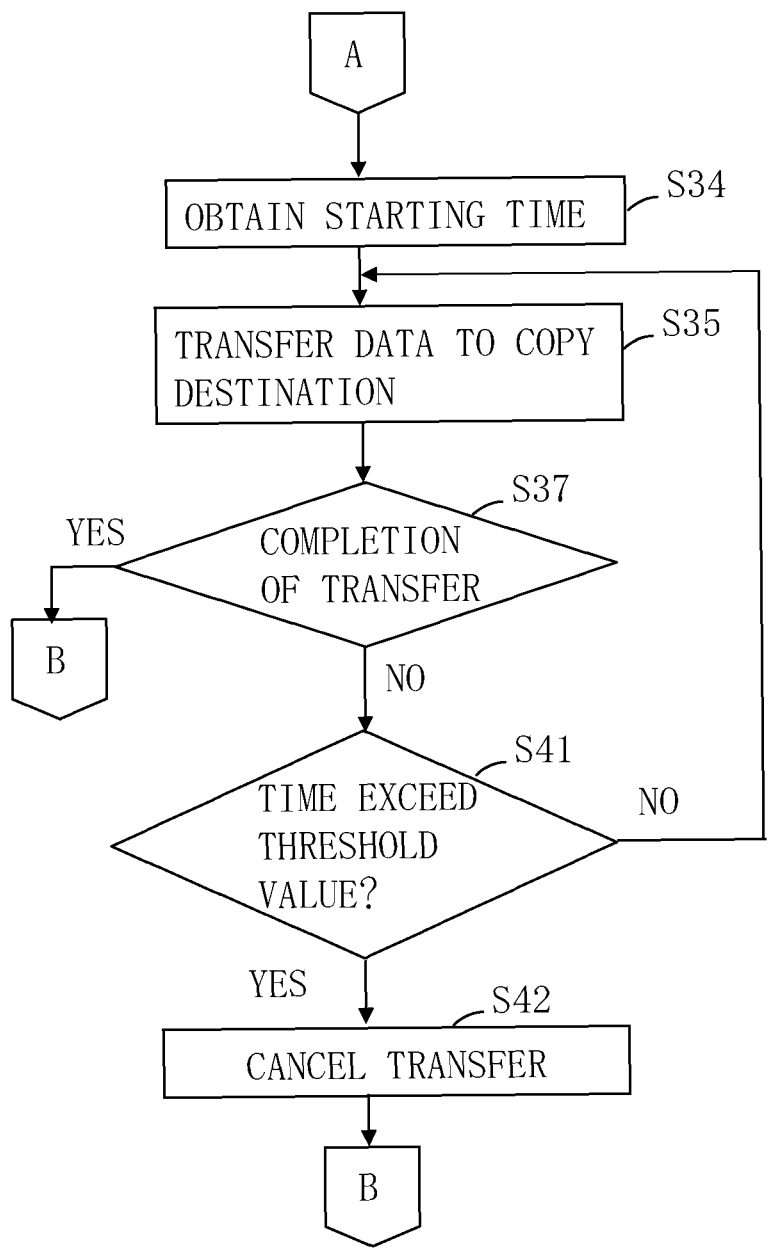

FIGS. 13A to 13B are a flowchart of a copy process B. The copy process in the storage apparatus 1-2 will be described. The copy process from the storage apparatus 1-2 to the storage apparatus 1-3 is executed. It is assumed that the copy session has been already established. When it is confirmed that the storage apparatus 1-2 is set at the intermediate position of the cascade connection by the initial control unit 67, the storage apparatus 1-2 obtains two regions in the consistency buffer management information 22. The first region is used for the copy session between the storage apparatuses 1-1 and 1-2, and the second region is used for the copy session between the storage apparatuses 1-2 and 1-3.

Upon reception of the buffer control management information 25 from the storage apparatus 1-1, the storage apparatus 1-2 allocates the consistency buffers 11-0 and 11-1.

Upon reception of the consistency buffer management information 22 from the storage apparatus 1-1, the storage apparatus 1-2 updates the status into the non-storage status in the first region of the consistency buffer management information 22 of the storage apparatus 1-2, while storing the rest of the information without being changed.

For the copy between the storage apparatuses 1-2 and 1-3, the storage apparatus 1-2 stores the copy destination LUN, the copy destination LBA, and the block number as the content of the consistency buffer management information 22 received from the storage apparatus 1-1 in the second region of the consistency buffer management information 22 of the storage apparatus 1-2 as the copy source LUN, the copy source LBA, and the block number. The copy destination LUN and the copy destination LBA are established by the copy session management information 21 and the copy source LBA.

Upon reception of the copy data, the storage apparatus 1-2 stores the data in the consistency buffers 11-0 and 11-1 (S31). The storage apparatus 1-2 turns the corresponding bit of the copy status management bit map of the copy session management information 21 ON. The storage apparatus 1-2 updates the status information of the consistency buffer management information 22 in the first region into the storage status.

Upon completion of receiving all the copy data from the consistency buffers 11-0 and 11-1 of the storage apparatus 1-1 (S32), the storage apparatus 1-2 transfers the copy data to the disk unit 4 (S33). As the storage apparatus 1-2 is set to be cascade connected, it transfers the copy data to the disk unit 4, and sets the transfer control starting time in the buffer status management information 24 by obtaining the time from the clock 65 so as to start the data transfer to the storage apparatus 1-3 (S34). The storage apparatus 1-2 then transmits the buffer control management information 25 and the consistency buffer management information 22 to the storage apparatus 1-3.

The storage apparatus 1-2 collectively transfers the data to the consistency buffers 11-0 and 11-1 of the storage apparatus 1-3 to be cascade connected while maintaining each data status of the consistency buffers 11-0 and 11-1 (S35). The storage apparatus 1-2 checks if the copy data transfer to the disk unit 4 thereof has been completed (S36) and if the data transfer to the storage apparatus 1-3 as the copy destination has ended (S37). If the copy data transfer to the disk unit 4 and the data transfer to the storage apparatus 1-3 as the copy destination have completed (S38), the storage apparatus 1-2 transmits the completion notification to the storage apparatus 1-1 (S39). The storage apparatus 1-2 releases the consistency buffer 11 (S40), and clears the bit corresponding to the data having the data transfer completed from the copy status management bit map.

Upon confirmation with respect to completion of the copy data transfer to the disk unit 4, and the time for the data transfer to the storage apparatus 1-3 as the copy destination, if the monitored time exceeds the threshold value (S41), the storage apparatus 1-2 forcibly ends the data transfer to the storage apparatus 1-3 (S42), and the process proceeds to step S38. If the transfer from the storage apparatus 1-1 as the copy source exists, the storage apparatus 1-2 executes the transfer interruption process in the earlier stage so as not to give the influence. In this way, the added time monitor control allows the data transfer process at least between one apparatus and another to be continued. The remote copy is made available among plural cascade connected storage apparatuses while securing the copy data sequence.

Upon completion of storing the copy data received from the storage apparatus 1 as the copy source, the consistency buffer 11 transfers the data to the storage apparatus 1 as the copy destination while maintaining the storage status. As a result, two consistency buffers for reception and transfer do not have to be provided, thus reducing the capacity of the consistency buffer 11.

Figure 14:
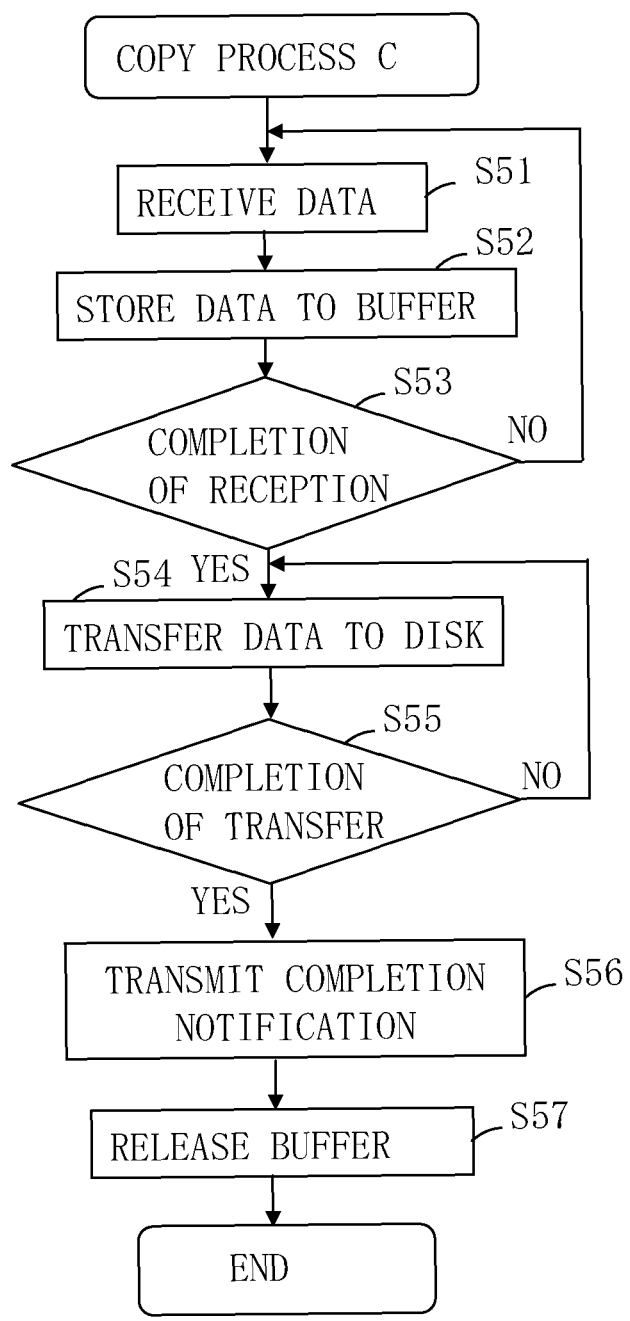
FIG. 14 is a flowchart of copy process C.

FIG. 14 is the flowchart of a copy process C. The copy process in the storage apparatus 1-3 will be described.

Upon reception of the buffer control management information 25 from the storage apparatus 1-2, the storage apparatus 1-3 allocates the consistency buffers 11-0 and 11-1. Then the storage apparatus 1-3 updates the status of the consistency buffer management information 22 received from the storage apparatus 1-2 into the non-storage status in the region of the consistency buffer management information 22 of the storage apparatus 1-3, while storing the rest of the data without being changed. Upon reception of the copy data (S51), the storage apparatus 1-3 stores the data in the consistency buffers 11-0 and 11-1 (S52). The storage apparatus 1-3 changes the status corresponding to the consistency buffer management information 22 into the storage status.

Upon completion of receiving all the copy data from the consistency buffers 11-0 and 11-1 of the storage apparatus 1-2 (S53), the storage apparatus 1-3 detects the storage status of the consistency buffer management information 22, and extracts the information of the corresponding copy destination LUN and LBA. Then the copy data are transferred and reflected on the disk unit 4 in accordance with the aforementioned content (S54). The storage apparatus 1-3 checks if all the copy data transfers to the disk unit 4 have been completed (S55). If all the copy data transfers to the disk unit 4 have been completed, the storage apparatus 1-3 transmits the completion notification to the storage apparatus 1-2 (S56). The storage apparatus 1-3 then releases the consistency buffer 11 (S57).

As a result, the remote copy among plural cascade connected storage apparatuses 1 is made available while maintaining the copy data sequence. The completion notification of copy of the copy source to the storage apparatuses 1-2 and 1-3 may be performed after completion of data writing to the CACHE 7 rather than after completion of data writing to the disk unit 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage system for performing remote copying, comprising:
a first storage apparatus;
a second storage apparatus connected with the first storage apparatus; and
a third storage apparatus connected with the second apparatus,
the first storage apparatus including,
a first storage unit,
a first buffer, and
a first controller to control the first storage apparatus according to a process including,
storing data in the first storage unit into the first buffer, and
transferring all of the data stored in the first buffer to the second storage apparatus, upon the first buffer being full with the data or after a predetermined time has elapsed from storing the data into the first buffer,
the second storage apparatus including,
a second storage unit,
a second buffer, and
a second controller to control the second storage apparatus according to a process including
storing data received from the first storage apparatus into the second buffer,
outputting all of the data stored in the second buffer from the second buffer to the second storage unit, upon completing of reception of the data,
transferring all of the data stored in the second buffer to the third storage apparatus, upon completion of reception of the data from the first storage apparatus,
obtaining a starting time of transfer when the second storage apparatus starts to transfer the data to the third storage apparatus, and
cancelling the transfer of the data to the third storage apparatus when a prescribed time elapses from the starting time,
the third storage apparatus including,
a third storage unit,
a third buffer, and a third controller to control the third storage apparatus according to a process including,
    storing the data received from the second storage apparatus into the third buffer, and
    outputting all of the received data in the third buffer from the third buffer to the third storage unit, upon completion of reception of the data,
wherein, the second controller allows the receipt of data from the first storage apparatus, the storing and the outputting after the second controller cancels the transfer of the data to the third storage apparatus.

2. The storage system according to claim 1, wherein, the second storage apparatus transmits a completion notification to the first storage apparatus when the second controller completes the storing, the outputting and the transferring or when the second controller completes the storing, the outputting and the cancelling process.

3. A storage apparatus for performing remote copying, the storage apparatus being connected to a copy source storage apparatus and a copy destination storage apparatus, the storage apparatus comprising:
    a storage unit to store copy data;
    a buffer to temporarily store the copy data; and
    a controller to control the storage apparatus according to a process including
    storing copy data received from the copy source storage apparatus into the buffer,
    outputting all the stored copy data from the buffer to the storage unit, upon completion of reception of the copy data,
    transferring all of the copy data stored in the buffer to the copy destination storage apparatus, upon completion of reception of the copy data
    obtaining a starting time of transfer when the controller starts to transfer the copy data to the copy destination storage apparatus, and
    cancelling the transfer of the copy data to the copy destination storage apparatus when a prescribed time elapses from the starting time,
    wherein, the controller allows the receipt of the copy data from the copy source storage apparatus, the storing and the outputting after the controller cancels the transfer of the copy data to the copy destination storage apparatus.

4. The storage apparatus according to claim 3, wherein the controller transmits a completion notification to the copy source storage apparatus when the controller completes the storing, the outputting and the transferring, or when the controller completes the storing, the outputting and the cancelling.

5. A remote copy method of a storage apparatus located in a middle of a plurality of storage apparatuses, the storage apparatus including a storage unit to store copy data and a buffer to temporarily store the copy data, the method comprising:
    receiving copy data from a copy source storage apparatus;
    storing the copy data received from the copy source storage apparatus into the buffer;
    outputting all of the copy data in the buffer into the storage unit, upon completion of reception of the data;
    transferring all of the stored copy data in the buffer to a copy destination storage apparatus, upon completion of reception of the data,
    obtaining a starting time of transfer when the transferring starts to transfer the data to the copy destination storage apparatus, and
    cancelling the transfer of the data to the copy destination storage apparatus when a prescribed time has elapsed from the starting time, wherein the receiving, the storing and the outputting are allowed after the cancelling is performed.

* * * * *